Figure 1:
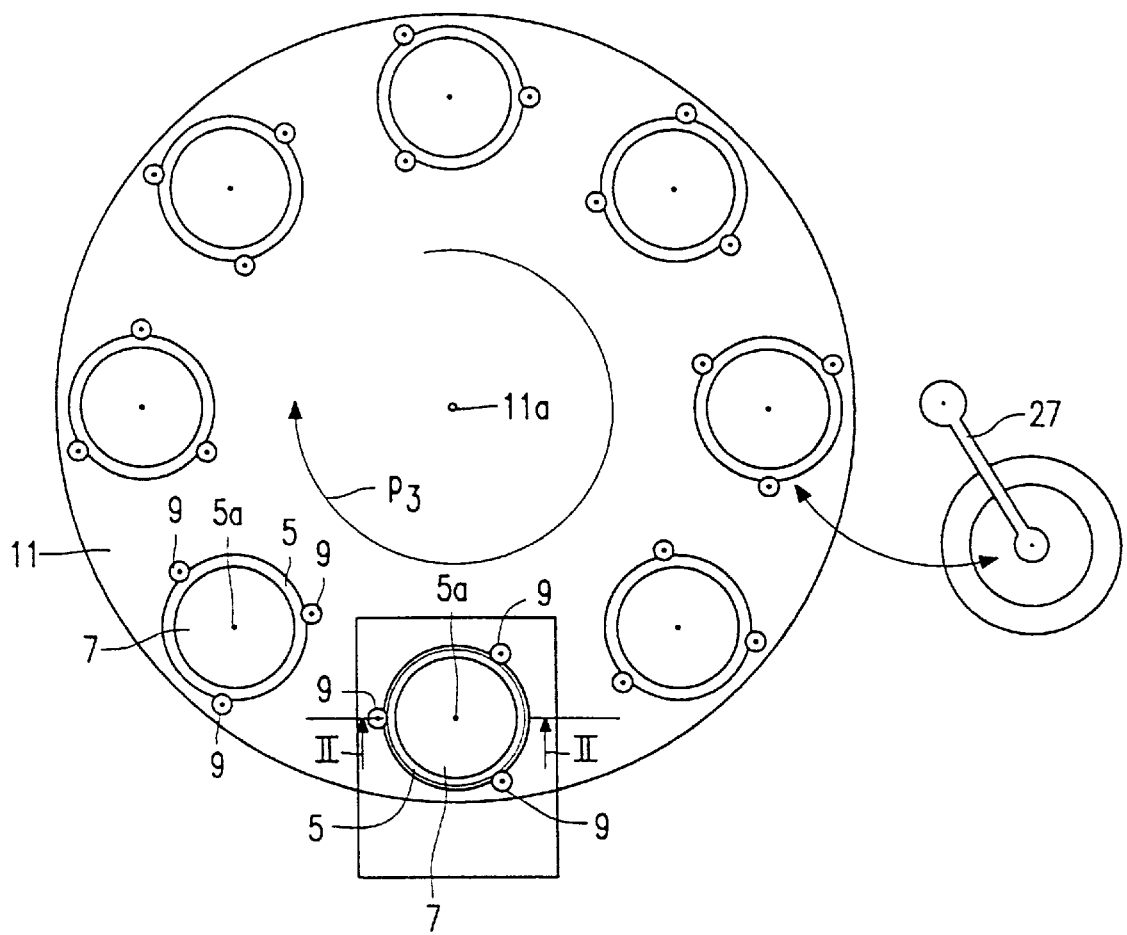

United States Patent [19]
Vromans et al.

[11] Patent Number: 6,148,542
[45] Date of Patent: Nov. 21, 2000

[54] METHOD FOR CURING AN ADHESIVE BETWEEN TWO LAYERS OF AN INFORMATION CARRIER

[75] Inventors: Petrus H. G. M. Vromans; Remberto L. T. Martis; Paulus W. J. Brugel, all of Eindhoven, Netherlands

[73] Assignee: U.S. Philips Corporation, New York, N.Y.

[21] Appl. No.: 09/516,033

[22] Filed: Mar. 1, 2000

Related U.S. Application Data

[62] Division of application No. 09/083,695, May 21, 1998.

[30] Foreign Application Priority Data

May 27, 1997 [EP] European Pat. Off. .............. 97201601

[51] Int. Cl.[7] ...................................................... F26B 7/00
[52] U.S. Cl. ................................. 34/420; 34/276; 34/516; 428/64.1; 428/65.3; 369/283; 369/286
[58] Field of Search .............................. 34/275, 276, 418, 34/420, 481, 516, 266, 267, 444, 448; 428/64.1, 64.2, 64.4, 65.3; 369/94, 283, 286

[56] References Cited

U.S. PATENT DOCUMENTS

| | | | |
|---|---|---|---|
| 5,828,648 | 10/1998 | Takasu et al. | 369/275.1 |
| 5,858,498 | 1/1999 | Ohkubo et al. | 428/64.1 |
| 5,966,357 | 10/1999 | Takasu et al. | 369/275.1 |
| 6,014,364 | 1/2000 | Takasu et al. | 369/275.1 |

FOREIGN PATENT DOCUMENTS

3642961A1  6/1987  Germany .

*Primary Examiner*—Pamela Wilson
*Attorney, Agent, or Firm*—Michael E. Belk

[57] ABSTRACT

A method of manufacturing an information carrier which cures an adhesive by means of UV radiation in an inert-gas atmosphere. The adhesive is interposed as an adhesive layer between two superposed layers of a disc-shaped information carrier. The device includes a UV source, a supplier for an inert gas, and a holder for holding the information carrier in a centered position with respect to a centering axis. The inert-gas supplier has discharge openings for inert gas, situated in a circular zone around the centering axis, at a distance from the centering axis which substantially corresponds to the radius of the peripheral edge of the information carrier, so as to cause inert gas to flow past the peripheral edge during curing, as a result of which locally present oxygen which would interfere with curing is expelled.

5 Claims, 4 Drawing Sheets

METHOD FOR CURING AN ADHESIVE BETWEEN TWO LAYERS OF AN INFORMATION CARRIER

CROSS REFERENCE TO RELATED APPLICATIONS

This is a divisional of application Ser. No. 09/083,695, filed May 21, 1998.

The invention relates to a device for curing an adhesive by means of radiation in an at least substantially oxygen-free atmosphere, which adhesive is interposed as an adhesive layer between two superposed layers of a disc-shaped information carrier, which layers together define a peripheral edge of the information carrier, which device comprises a radiation source and a supply means for a gas, not being oxygen.

Such a device is known and is used in the production of optical information carriers of a type comprising two substrates glued to one another, at least one of said substrates carrying an information layer. During production a UV-curing polymerizable adhesive is applied, after which the assembly thus formed is irradiated by means of a UV irradiation device in a nitrogen atmosphere. The adhesive then cures by polymerization reactions in which radicals are formed.

DE-A 3642961 refers to the use of UV-curing adhesives as alternatives for epoxy-resin adhesives. However, a method in which such adhesives are cured in a nitrogen atmosphere is not considered to be a suitable mass-production method because of the intricate equipment required for this.

It is an object of the invention to provide a device of the type defined in the opening paragraph, enabling adhesive layers to be cured during the large-scale production of information carriers.

To this end, the device in accordance with the invention is characterized by the presence of a holding means for holding the information carrier in a centered position with respect to a centering axis, the gas supply means having discharge openings for a gas, not being oxygen, which discharge openings are situated in a circular zone around the centering axis, at a distance from the centering axis which at least substantially corresponds to the radius of the peripheral edge of the information carrier, so as to cause a gas, not being oxygen, to flow past the peripheral edge during curing. Preferably, the discharge openings for inert gas are situated in a wall portion of the device.

It will be evident that said information carrier is stationary while the device in accordance with the invention is used, i.e. while the adhesive layer is being cured.

At least one of the layers to be attached to one another by means of the adhesive is transparent to the radiation used. In the present context the term "layer" is to be understood to mean also a substrate. In principle, the adhesive means can be adhesives such as photo-polymerizable acrylates.

In the device in accordance with the invention an at least substantially oxygen-free atmosphere is created locally, specifically at the peripheral edge of the information carrier, in order to preclude that radicals formed at the periphery during curing are destroyed by reaction with oxygen from the air. It has been found that in this way curing of the entire adhesive layer is possible at a comparatively low irradiation intensity. Another advantage of supplying the gas for the expulsion of the oxygen only at the periphery is that the supplied gas is used efficiently, as a result of which the required amount of gas is comparatively small. A suitable gas is preferably an inert gas. Preference is then given to nitrogen but gases such as argon, helium or neon are also suitable. Preferably, the radiation source is a UV source when conventional adhesives are used.

The device in accordance with the invention can be used successfully in the manufacture of optical discs in accordance with the recently defined DVD standard. Such discs comprise two substrates connected to one another by means of an adhesive layer, at least one of the substrates being provided with an information layer. In certain versions the adhesive layer should have a specified thickness and should be transparent.

A practical embodiment of the device in accordance with the invention is characterized by the presence of a curing chamber having a wall formed with discharge openings, in which chamber the holding means is disposed at least during curing, which chamber has discharge means for gas. For a gas flow directed towards the peripheral edge the discharge openings are preferably situated opposite the holding means, viewed along the centering axis.

In order to guarantee a uniform flow around the information carrier during curing the device in accordance with the invention preferably has the features defined in claim 5. These features further assure a uniform irradiation of the information carrier.

An optimization of the local flow around the information carrier during curing is achieved by means of an embodiment which is characterized in that the discharge openings are situated in a wall portion of the device, which wall portion extends opposite the holding means and which has a groove which surrounds the centering axis, in which groove at least a plurality of the discharge openings are situated. The presence of the groove, particularly in conjunction with a turntable which is rotated during curing, ensures that a highly oxygen-free gas atmosphere is formed, the peripheral edge being constantly disposed in the supplied gas.

An optimization of the irradiation of the information carrier during curing is achieved with an embodiment of the invention having the features defined in claim 7. These features lead to a reduction of the required power of the radiation source.

An embodiment of the device in accordance with the invention, which enables an information carrier to be loaded into and removed from the curing chamber in a simple manner, is characterized by the features as defined in claim 8.

An embodiment of the device in accordance with the invention, which is very suitable for mass production, is characterized in that the holding means forms part of a collection of holding means which can be positioned successively with respect to the discharge openings.

The invention further relates to a method of manufacturing a disc-shaped information carrier having two superposed layers between which an adhesive layer extends. In this connection the invention aims at providing a method which enables an adhesive layer to be cured during the manufacture of an information carrier in mass-production quantities.

The method in accordance with the invention is characterized in that for curing of the adhesive layer use is made of the device in accordance with the invention.

The invention moreover relates to a further method of manufacturing a disc-shaped information carrier having two superposed layers between which an adhesive layer extends.

In this connection the invention aims at providing a method which enables a highly homogeneous adhesive layer to be formed.

To this end, the further method in accordance with the invention is characterized in that an adhesive is applied to one of the layers in two phases, a face of the respective layer being wholly covered with an adhesive during a first phase, after which an annular zone of adhesive is formed during a second phase, upon which both layers are moved opposite one another and towards one another and are subsequently pressed onto one another, after which curing of the adhesive is effected. Surprisingly, it has been found that this method of affixing layers to one another, layers being meant to include substrates, makes it possible to form a homogeneous adhesive layer free of gas bubbles. The adhesive is preferably cured by means of the afore-mentioned device in accordance with the invention but the present method is not limited thereto.

During the manufacture of certain information carriers, particularly optical information carriers, such as certain types of DVDs, it is necessary to form a uniform adhesive layer of a well-defined layer thickness, without any gas inclusions, which are generally air inclusions, being formed. In order to obtain an adhesive layer without gas inclusions it has proved to be favorable to feed an ionized gas stream, for example an ionized air stream, past the applied adhesive after completion of the first phase, during which phase one of the layers is actually wetted with the adhesive, but prior to the beginning of the second phase. Satisfactory results have been achieved with a gas stream having negative ions. Upon completion of the second phase the layers are brought into contact with one another as rapidly as possible. It has been found that just before actual contact is established the adhesive present in the zone slightly spreads over the wetted layer owing to a potential difference which prevails between the annular zone of adhesive and the other layer, which has not been provided with adhesive. After contact has been made and during the subsequent pressing-down the adhesive spreads over the entire area of the layers without any gas inclusions being formed. In this respect it has proved to be important that after a first contact has been made the layers are moved slowly towards one another to allow the adhesive to spread over the whole area of the layers. An important further aspect is that upon completion of the second phase the layers extend parallel to one another as they come into contact with one another and are pressed onto one another. In the case of non-flat layers it may be favorable to give one or both layers a slightly curved shape, particularly a convex shape.

In order to obtain an adhesive layer having a well-defined layer thickness, it has proved to be advantageous to provide one or both layers, prior to the adhesion process, with an annular recess for receiving excess adhesive said recess is preferably an annular recess adjoining the usually present central hole of the information carrier. Such a recess, as well as any excess adhesive, is situated outside the information area of the information carrier thus manufactured and is therefore not a hindrance. Moreover, using this measure has the advantage that the layers adhere to one another over their whole areas, which has a favorable effect on the mechanical stability of the information carrier thus manufactured.

If the layers are spun prior to being pressed together, it is recommended to provide one or both layers with an annular projection adjoining said annular recess. Such a projection gives rise to a capillary action on the adhesive, thereby precluding the outflow of adhesive from the recess during spinning.

Within the scope of the foregoing, the invention also relates to an information carrier as defined in claim 15 or 16.

Figure 2:
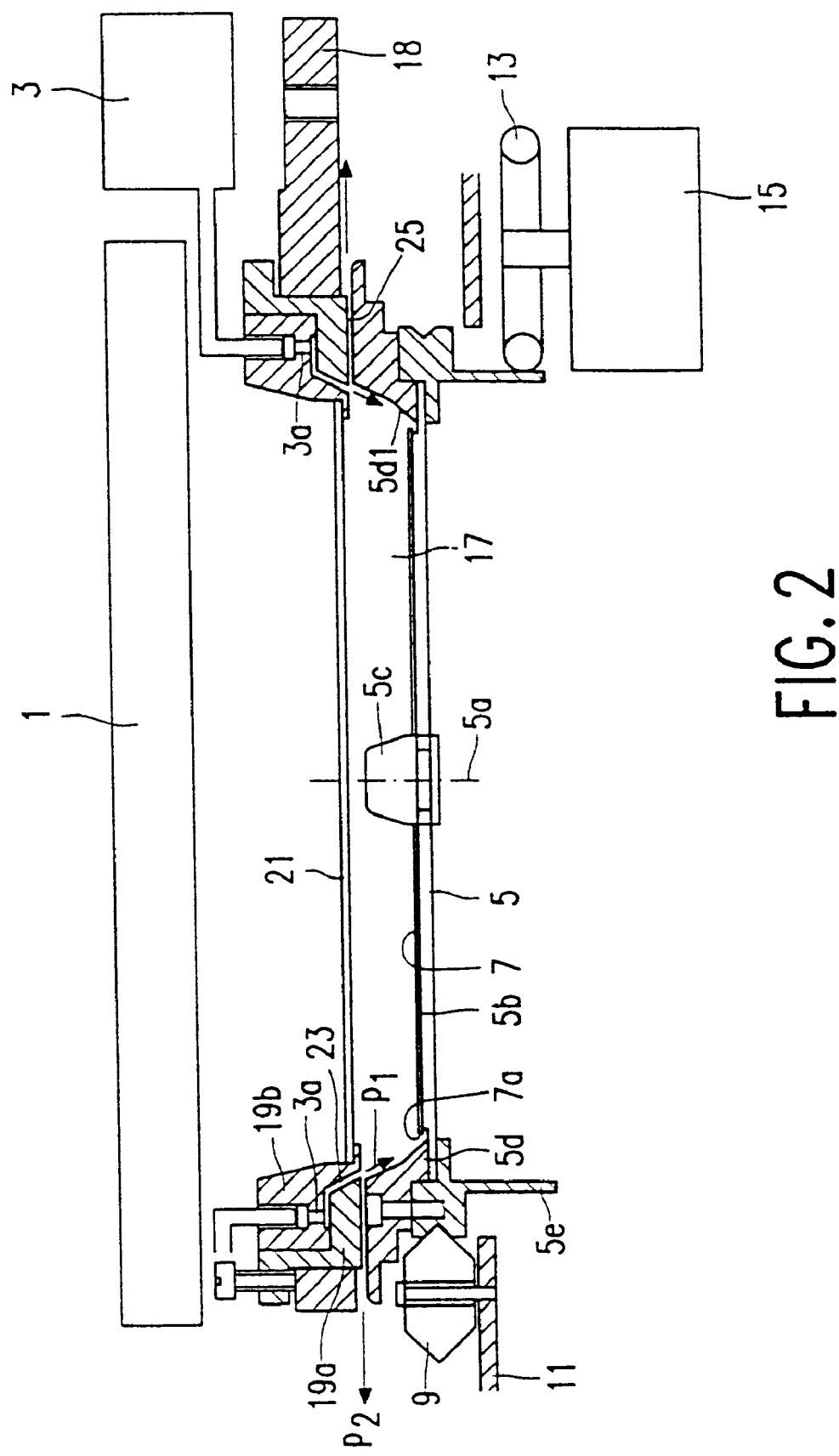
Figure 3A:
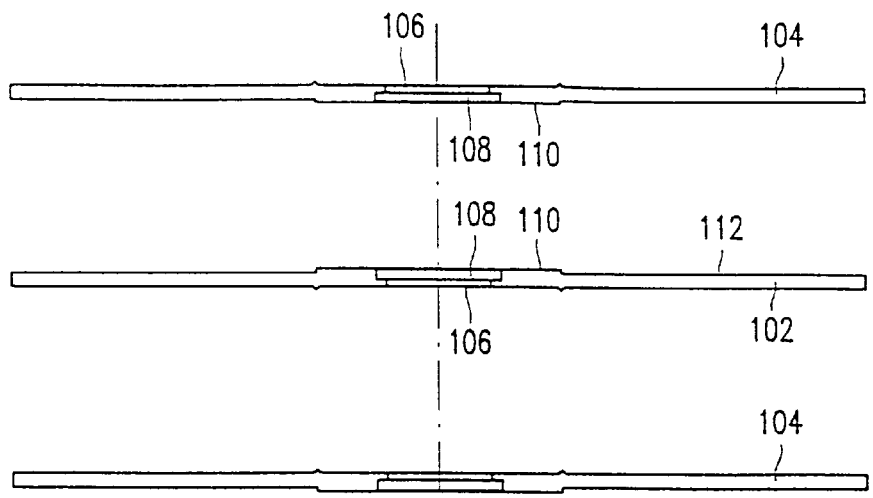
Figure 3B:
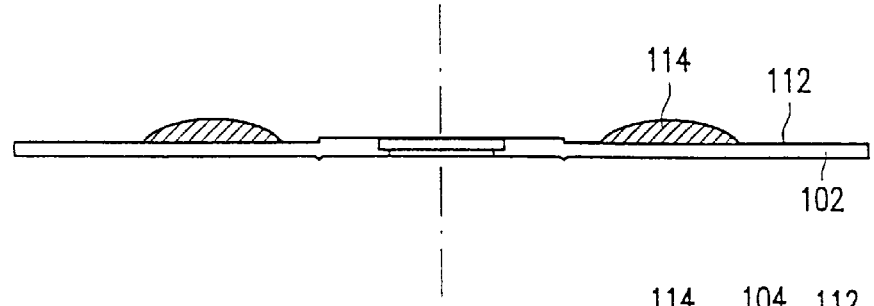
Figure 3C:
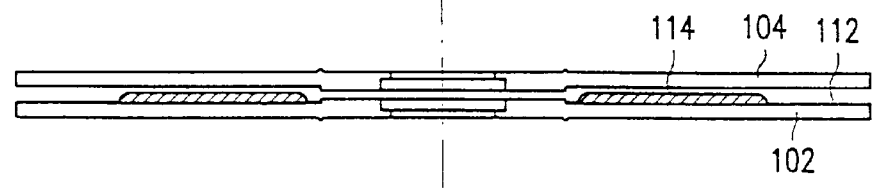
Figure 3D:
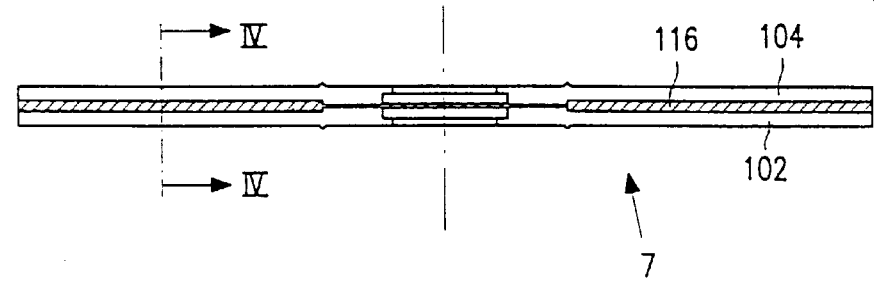
Figure 4A:
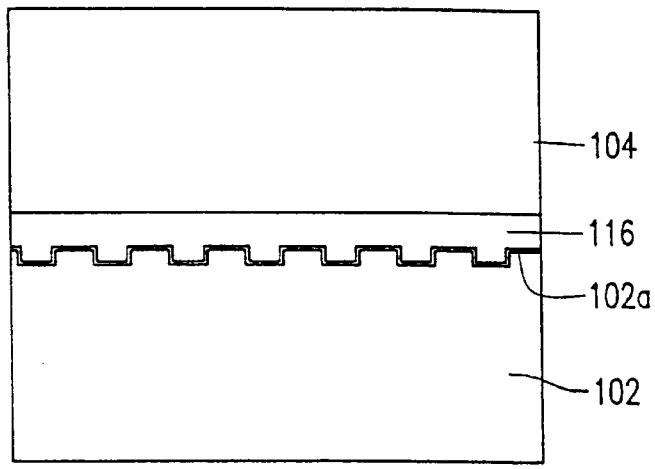
Figure 4B:
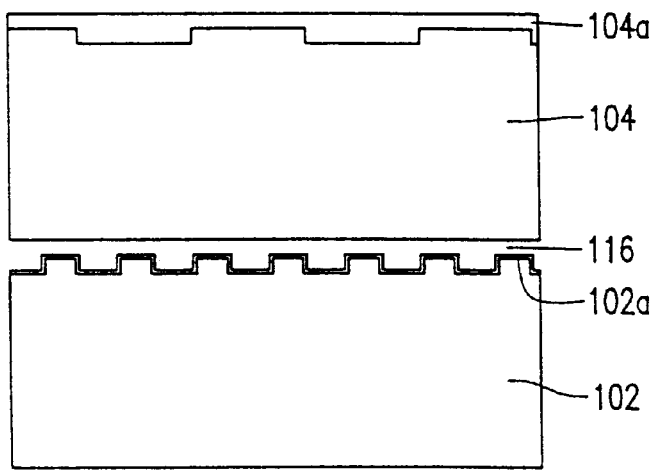
Figure 4C:
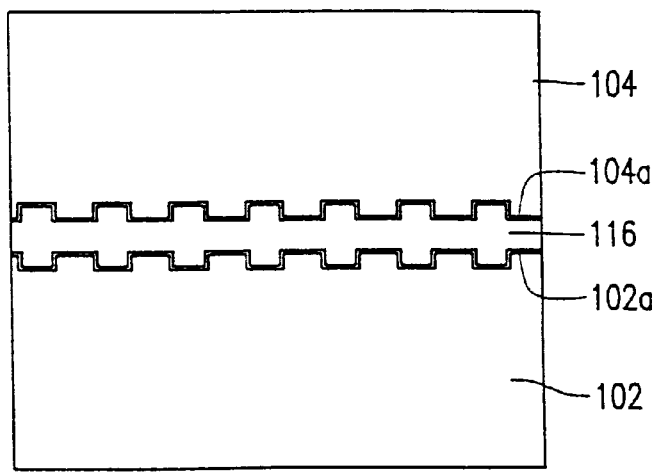

The invention will now be described in more detail, by way of example, with reference to the drawings, in which FIG. 1 is a diagrammatic plan view showing an embodiment of the device in accordance with the invention, FIG. 2 is a sectional view taken on the line II—II in FIG. 1, FIGS. 3A–3D illustrate diagrammatically a number of steps of an example of the further method in accordance with the invention, and FIGS. 4A–4C are sectional views taken on the line IV—IV in FIG. 3D, showing segments of embodiments of the information carrier in accordance with the invention.

The embodiment of the device in accordance with the invention shown in FIGS. 1 and 2 is intended for curing an adhesive by means of UV radiation in a nitrogen atmosphere, which adhesive is in particular a photopolymerizable acrylate present between two substrates of an optical information carrier to be formed, particularly a DVD. The device comprises a radiation source 1 in the form of a radiation unit with UV lamps, a supply device for nitrogen, and a holding means which forms part of a turntable 5, for holding an information carrier 7 being formed, which information carrier has a peripheral edge 7a. By means of three bearing rollers 9 the turntable 5 is supported in a frame, which in the present example forms part of a rotatable platform 11. The turntable 5 is rotatable relative to the platform 11 about an axis of rotation 5a. The turntable 5 includes a holding apparatus comprised of a carrying surface 5b and a centering mandrel 5c, respectively for supporting and centering the information carrier 7, the axis of rotation 5a defining a centering axis for the information carrier 7. The turntable 5 further has a wall portion 5d, which extends around the axis of rotation 5a, at a distance from this axis slightly larger than the radius of the peripheral edge 7a of the information carrier 7. The wall portion 5d has one or more reflective surfaces 5d1 for aiming UV rays at the adhesive situated near the peripheral edge 7a during irradiation. The turntable 5 further comprises a circularly cylindrical drivable portion 5e adapted to cooperate with a drive wheel 13 of an electrical drive means 15.

A stationary device part 18 is disposed opposite the turntable 5 and has wall portions 19a and 19b as well as a transparent plate, in the present example a glass plate 21, supported by the wall portion 19b. The turntable 5, the wall portions 19a and 19b, and the transparent plate 21 together form a curing chamber 17. If desired, for example in the case of two-sided irradiation, a part of the turntable, particularly the part underneath the carrying surface 5b, can be made of a transparent material. The nitrogen supply device has discharge openings 3a arranged in a circular zone around the centering axis 5a. In the present example the number of discharge openings 3a is eight, the discharge openings being equispaced in a groove 23 which surrounds the centering axis 5a and is situated opposite the turntable 5. The groove 23, which is basically slit-shaped, terminates in the curing chamber 17, nitrogen gas flowing into the curing chamber 7 as indicated by the arrows P1 during the curing process. In order to allow the air present in the curing chamber 7 to be discharged, a slit-shaped discharge opening 25 is formed between the turntable 5 and the wall 19a, via which opening gas, i.e. air and possibly nitrogen, can be discharged as indicated by an arrow P2.

The afore-mentioned rotatable platform 11, which is rotatable about an axis of rotation 11a, forms part of a transport device, and in the present example it comprises eight turntables 5, thereby forming a collection of holding apparatuses which are successively movable to a position opposite the stationary device part 18 by rotation of the platform as indicated by an arrow P3. To load information carriers 7 onto and remove them from the platform 11 the device in the present example comprises a loading mechanism having a pivotable gripper 27.

A example of the further method in accordance with the invention will be described in more detail with reference to FIGS. 3A through 3D. This method is a method of manufacturing a disc-shaped information carrier, starting from two substrates 102 and 104. Hereinafter, these substrates, which are both transparent in the present example, are also referred to as the layer 102 and the layer 104, respectively. In this example, each of the layers 102 and 104 has a center hole 106, an annular recess 108 adjoining the center hole 106, and an annular projection 110 adjoining the recess 108. In a first phase of the method in accordance with the invention an adhesive is applied to the layer 102 and is spread over the entire layer surface of the layer 102 by spinning so as to form a thin layer 112 of adhesive. An air stream carrying negative ions is passed over this layer 112, after which adhesive, particularly a polymerizable acrylate, is deposited onto the negatively charged thin layer 112 as a closed annular zone 114. Immediately after this, the layers 102 and 104 are moved towards one another, the approach speed just before contact is made being so low as to allow the adhesive in the zone to flow out under the influence of potential differences prevailing between the adhesive in the zone 114 and the layer 104 (FIG. 3C). Subsequently, the layers 102 and 104 are pressed onto one another, the adhesive spreading over the whole layers 102 and 104 to form an adhesive layer 116 of a well-defined thickness, for example 55 microns. Any excess adhesive is accommodated in the recesses 108. The resulting adhesive layer 116 of the information carrier thus being formed, which as in the preceding Figures bears the reference numeral 7, can be cured in the device in accordance with the invention.

FIGS. 4A through 4C show segments of possible embodiments of the information carrier in accordance with the invention. FIG. 4A shows diagrammatically a DVD single-layer version, of which at least the substrate 102 is transparent. The substrate 112 carries an information layer 102a, which is at least substantially wholly reflecting for a radiation beam which is incident via the substrate 102. The adhesive layer 116 is situated between the substrate 102 carrying the information layer 102a, one the one side, and the substrate 104, on the other side. FIG. 4B shows a forward compatible DVD version. Both substrates 102 and 104 of this information carrier are transparent. The substrate 102 carries an information layer 102a, which is reflecting for a given wavelength, in the present example 650 nanometers, but transparent for another wavelength, in the present example 780 nanometers. The substrate 104 carries an information layer 104, which is reflecting for a radiation beam which is incident via the substrates 102 and 104. The adhesive layer 116 is situated between the substrate 102 carrying the information layer 102a, one the one side, and the substrate 104 carrying the information layer 104a, on the other side. The information carrier shown in FIG. 4C is a one-sided dual-play DVD. Of this information carrier at least the substrate 102 is transparent to an incident radiation beam. The substrate 102 carries an information layer 102a, which is semi-reflective and semi-transmissive. The substrate 104 carries an information layer 104a, which is fully reflecting for a radiation beam which is incident via the substrate 102. The adhesive layer 116 interposed between the layers 102a and 104a which in the present example, as in the preceding examples, is transparent to the radiation of the customary scanning beams.

It is to be noted that the invention is not limited to the examples disclosed herein. For example, instead of nitrogen any other gas which is inert to the adhesive can be used for the creation of an atmosphere which is inert to the applied adhesive. Depending on the initiators in the adhesive the polymerization can also be effected by means of radiation other than UV radiation.

What is claimed is:

1. A method of manufacturing a disc-shaped information carrier having two superposed structural layers between which an adhesive layer extends, that an adhesive is applied to one of the layers in two comprising the steps of:

wholly covering a face of a first structural layer with an adhesive coating during a first phase;

depositing an annular zone of adhesive on the face of the first structural layer over the adhesive coating during a second phase subsequent to the first phase;

positioning the first structural layer and a second structural layer opposite one another;

moving the structural layers towards one another;

pressing the structural layers onto one another; and curing of the adhesive.

2. The method of claim 1, in which curing includes the step of feeding an ionized gas stream past the applied adhesive after completion of the first phase but before the beginning of the second phase.

3. The method of claim 2, in which a gas stream carrying negative ions is used.

4. The method of claim 3, in which upon completion of the second phase, the layers extend parallel to one another as they come into contact with one another and are pressed onto one another.

5. A method of manufacturing a disc-shaped information carrier having two superposed layers between which an adhesive layer extends, comprising the steps of:

applying an uncured adhesive between the two layers;

holding the information carrier with uncured adhesive between the two layers in a centered position with respect to a centering axis;

supplying a gas which increases curing with respect to air, flowing from discharge openings near a periphery of the information carrier so as to flow over the periphery of the information carrier; and directing radiation onto the information carrier to cure the adhesive between the layers including the adhesive at the periphery.

\* \* \* \* \*

UNITED STATES PATENT AND TRADEMARK OFFICE
CERTIFICATE OF CORRECTION

PATENT NO.    : 6,148,542
DATED         : November 21, 2000
INVENTOR(S)   : Petrus H.G.M. Vromans, Remberto L.T. Martis and Paulus W.J. Brugel It is certified that error appears in the above-identified patent and that said Letters Patent is hereby corrected as shown below:

<u>Title page,</u>
Item [54], Title, change "METHOD" to -- DEVICE --.
Item [57], ABSTRACT,
Line 1, change "A method of manufacturing an information carrier which" to
-- A device --.

Signed and Sealed this

Twelfth Day of November, 2002

*Attest:*

JAMES E. ROGAN
*Attesting Officer*   *Director of the United States Patent and Trademark Office*